US007635135B2

(12) United States Patent
Huber et al.

(10) Patent No.: US 7,635,135 B2
(45) Date of Patent: Dec. 22, 2009

(54) WHEELCHAIR WITH WHEEL TRACK ADJUSTABILITY

(75) Inventors: Ralf Huber, Sinsheim (DE); Stefan Schillo, Sinsheim (DE); Joachim Eiser, Mosback-Nackareiz (DE); Alexander Müller, Sinsheim (DE)

(73) Assignee: Otto Bock HealthCare GmbH, Duderstadt (DE)

( * ) Notice: Subject to any disclaimer, the term of this patent is extended or adjusted under 35 U.S.C. 154(b) by 124 days.

(21) Appl. No.: 11/740,262

(22) Filed: Apr. 25, 2007

(65) Prior Publication Data

US 2007/0246907 A1 Oct. 25, 2007

(30) Foreign Application Priority Data

Apr. 25, 2006 (DE) ...................... 10 2006 019 001

(51) Int. Cl.
*B60R 9/10* (2006.01)

(52) U.S. Cl. .............................. 280/86.753; 280/304.1

(58) Field of Classification Search ................. 280/649, 280/86.751, 250.1, 86.75, 86.753, 661, 304.1; 297/339; 41/21
See application file for complete search history.

(56) References Cited

U.S. PATENT DOCUMENTS

| | | | | | |
|---|---|---|---|---|---|
| 2,900,196 | A | * | 8/1959 | Nienke | 280/86.756 |
| 4,650,208 | A | * | 3/1987 | Mason | 280/86.757 |
| 4,875,697 | A | * | 10/1989 | Miller | 280/86.758 |
| 4,921,271 | A | * | 5/1990 | Berry et al. | 280/86.756 |
| 5,044,659 | A | * | 9/1991 | Specktor et al. | 280/86.753 |
| 5,060,962 | A | * | 10/1991 | McWethy | 280/304.1 |
| 5,110,151 | A | * | 5/1992 | Blechschmidt et al. | 280/86.753 |
| 5,294,142 | A | * | 3/1994 | Weege | 280/304.1 |
| 5,333,894 | A | * | 8/1994 | Mayes | 280/250.1 |
| 6,182,992 | B1 | * | 2/2001 | Garven, Jr. | 280/250.1 |
| 6,276,760 | B1 | * | 8/2001 | Everett | 301/124.2 |
| 6,446,991 | B1 | * | 9/2002 | Klais | 280/86.75 |
| 2004/0090030 | A1 | * | 5/2004 | Genick, II | 280/86.753 |
| 2004/0155429 | A1 | * | 8/2004 | Knopf et al. | 280/250.1 |

FOREIGN PATENT DOCUMENTS

| | | |
|---|---|---|
| DE | 37 42 547 | 12/1987 |
| DE | 296 05 439 | 3/1996 |
| EP | 1 652 503 | 5/2006 |
| GB | 2 128 143 | 4/1984 |

OTHER PUBLICATIONS

European Search Report dated Jul. 10, 2007.

* cited by examiner

*Primary Examiner*—Lesley D Morris
*Assistant Examiner*—Levon Fiore
(74) *Attorney, Agent, or Firm*—Faegre & Benson, LLP

(57) ABSTRACT

A wheelchair having wheel track adjustability. The wheelchair including a frame, a seat situated within the frame, two drive wheels mounted to the frame at wheel axles and at least one steerable wheel. Each axle connected to a fitting removably coupled to the frame, with the fitting mounted to at least one support plate whose thickness varies around the circumference to position the fitting and axle at an angle. The support plate rotatable to change the angle of the fitting and axle and thereby correct wheel track error. The support plate mountable to a bracket pivotally mounted to the frame, such that pivoting movement of the bracket results in rotation of the support plates.

15 Claims, 6 Drawing Sheets

WHEELCHAIR WITH WHEEL TRACK ADJUSTABILITY

TECHNICAL FIELD

The invention relates to wheelchairs having rear drive wheels that are provided with adjustability of the wheel track.

BACKGROUND

The frame of a wheelchair consists of two collateral frame sections which are each formed from pipe or tubular material and which are connected to each other via a cross beam. A fitting is inserted in each of the collateral frame sections, into which a rear wheel (drive gear) can be screwed with its axle. In order to improve the maneuverability and turning radius of the wheelchair, the wheel axles may not be arranged vertically (0° camber), but at an angle, so that the wheels are inclined from the vertical toward each other and assume a positive camber. The fitting is inserted into the collateral frame section diagonal to the angle forced by the camber angle using the support plates.

In order to be able to adjust the wheelchair to the individual requirements of the user, among other things the seat angle must be able to be changed. In the currently described wheelchair, the seat is rigidly connected to the collateral frame sections and the cross beams, so that an incline position can only be achieved if the frame is tilted, which can be done using wheels with a greater or smaller diameter or though attaching the wheels to the frame at a different height. If rear wheels with a smaller diameter are used, the frame will tilt backward in accordance with the smaller diameter and the seat tilts accordingly.

Through the tilt movement of the frame, the position of the longitudinal axis of the fittings changes as well as the position of the wheel axles and the camber lead to changing the track. The distance between the rear wheels is then greater or smaller in front of the axle than behind it. With the change of the track, the performance of the wheelchair will change. A tendency to wobble and increased tire wear are the results.

From DE 37 42 547 A1, a sport wheelchair is known, on which the collateral frame is equipped with protruding perforated plates for support of the axles for the rear wheels, for which the perforated plates are positioned to be able to pivot around an axle.

DE 296 05 439 U1 publishes a wheelchair with an undercarriage frame which consists of two collateral frame sections each with an upper and lower frame section, each being able to have a perforated plate to support and store a secure yet removable anchor for a wheel axle in the hub of the drive gear.

From GB 2 128 143 A, a wheelchair is known whose frame is made up of a bearing block, which has a number of bearing bores, in order to adjust the wheels selectively on various horizontal and/or vertical levels.

Starting from this problem, the wheelchair described at the beginning should be improved, so that the track of the rear wheels is adjustable.

SUMMARY

As a solution to this problem, a generic wheelchair would be equipped with at least one support plate that is rotatable over a prescribed range on the frame and is coupled to a fitting for the wheel axle.

If the position of the longitudinal axis of the fittings in the frame changes because the rear wheels constructively allow different diameters or are attached to the frame at a different height, an error in the wheel track can occur. In this configuration, this position change can be compensated by a corresponding rotation of the support plate and fitting.

To this end, the fitting is as attached to the frame using a pivoting bracket with the particular preferable support screws. The bracket is formed into a U-shape and attached around a frame section.

It is particularly preferable that the bracket is bilaterally provided with two recesses, into which the corresponding stud of each support plate can be inserted fixing the support plate relative to the bracket. Through the varying thicknesses of the support plates, the design-indicated camber is achieved. Through a pivot movement of the bracket, the support plates and the diagonal fitting are rotated, countering the wheel track error.

The fitting for this is primarily mounted using the bracket and the support plates between two nuts. The bracket is provided with an arc shaped slot, whose ends serve as the pivoting range for the bracket, in order to limit the brackets' rotational movement.

The pivot range of the bracket is preferably 15°.

In order to make adjustment easier, the bracket is truncated on at least one exterior side. An air lever may be fitted here. Then the bracket is turned. If the horizontal is exactly set, the toe-in is 0 and there is no wheel track error.

With the aid of an illustration, a design model of the invention will be more closely elucidated as follows.

DETAILED DESCRIPTION

Figure 7:
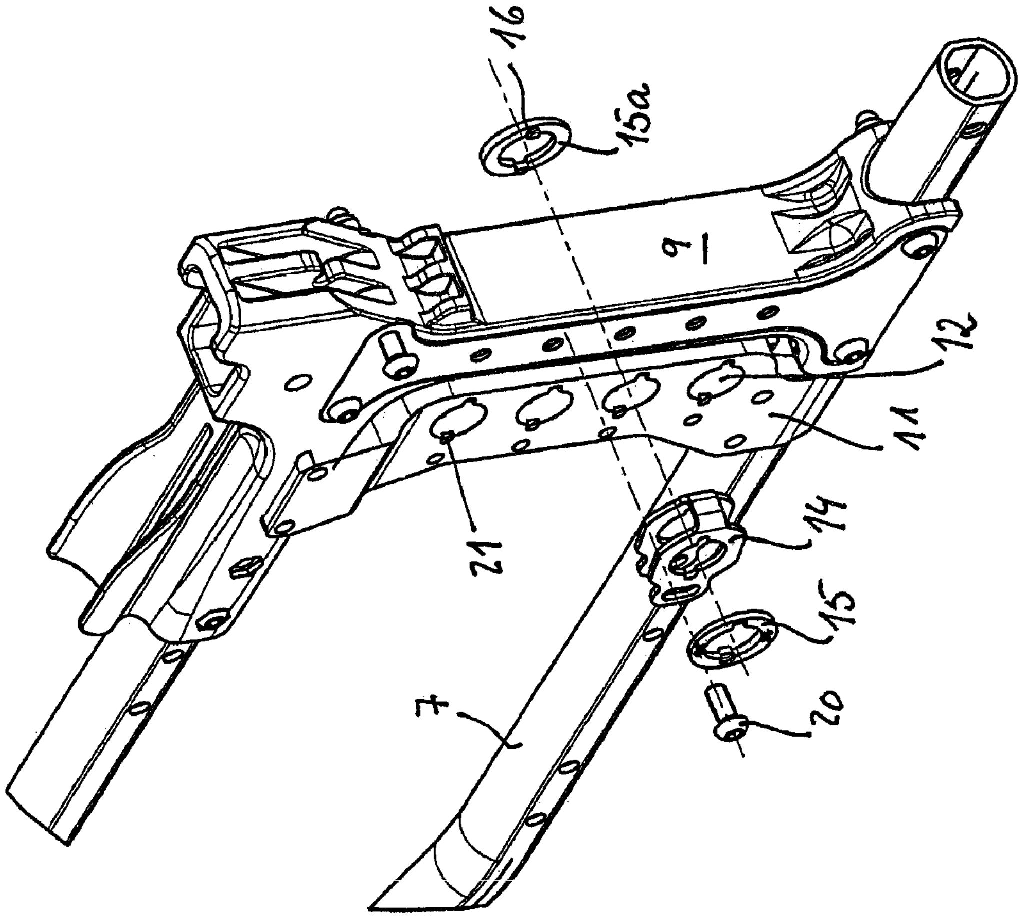
FIG. 7: perspective exploded view of a section of the frame.
Figure 8:
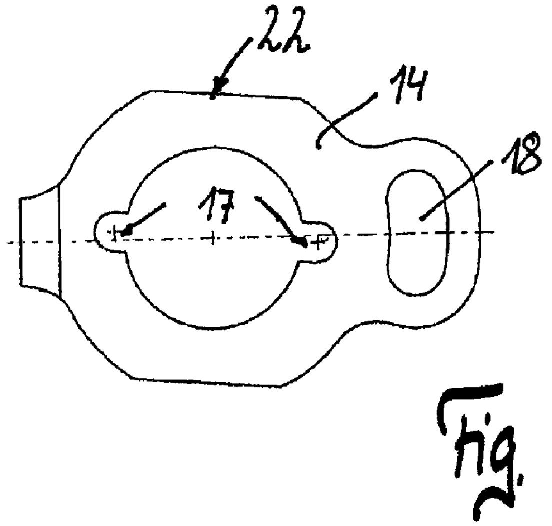
FIG. 8: view of the bracket.
Figure 9:
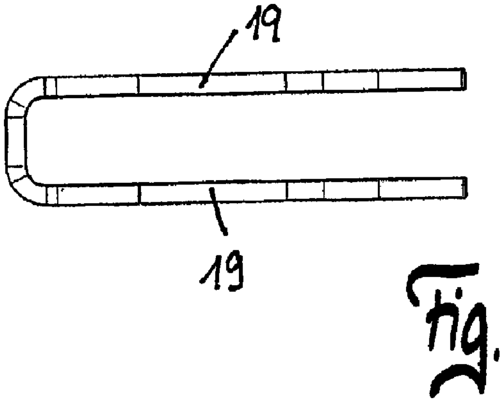
FIG. 9: top view of the bracket.
Figure 10:
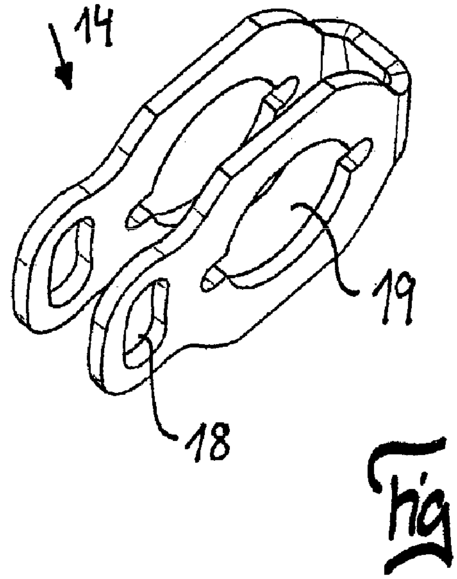
FIG. 10: perspective representation of the bracket.

The wheelchair, as shown in FIGS. 1-4, consists of the frame 8, which is made up of two frame sections 7, 7', which are connected with each other via cross beams (not illustrated here). A seat 5 and a foot rest 6, as well as drive wheels 1, 2 and both steerable front wheels 3, 4, are also illustrated. The 7, 7' frame sections are identically formed and consist of a U-shaped arced pipe, whose free ends are held together with a support 9. Hand grips 10 protrude upward out of the supports 9. The free ends of the frame sections 7, 7' are also connected using supports 11 having multiple successive boreholes 12. The bore holes 12 are provided with two depressions 21 that extend from opposite sides of the circumferential contour, as shown in FIG. 7. The depressions 21 work together with lugs 16 of support plates 15, 15_a_, so that the positioning of the support plates 15, 15_a_ is constructively determined for frame section 7. The rear wheels 1, 2 are positioned to turn on their axles mounted to the frame sections 7, 7' by a fitting 13 mounted at one bore hole 12 of support 11. In order to achieve an incline of the axles of the rear wheels 1, 2, opposite the wheel footprint S, and with it the wheel camber, the fittings 13 are mounted at an angle. Together, support plates 15 and 15*a* make this possible due to a varying thickness around each of their circumferences, as shown in FIG. 7.

The fittings 13 are provided with external screw threads, so that nuts may be screwed on to both ends (not illustrated) and the fittings 13 can be tightened opposite support 11. Through the fact that support plates 15 and 15*a* do not have a constant thickness, the fittings pass through the support plates 15, 15*a* and the screw mechanisms for the fittings 13 are adjacent to the support plates 15, 15*a*, fittings 13 sit at an angle in support 11 determined by the thickness difference. The lugs 16 of the support plates 15, 15*a* grab the opposing depressions 21 in support 11, so that the position of support plates 15, 15*a* is design-indicated and the assembly is simplified.

Figure 3:
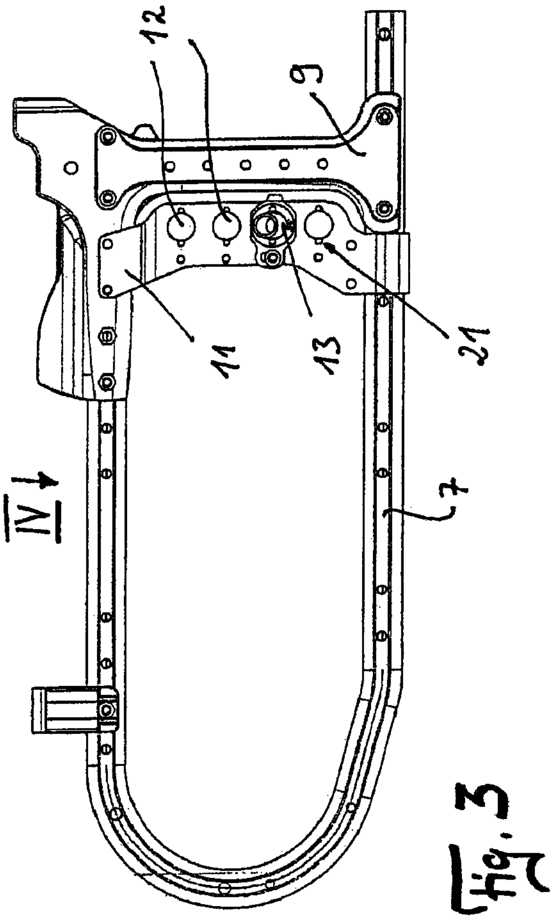
FIG. 3: side view of a collateral frame section.
Figure 5:
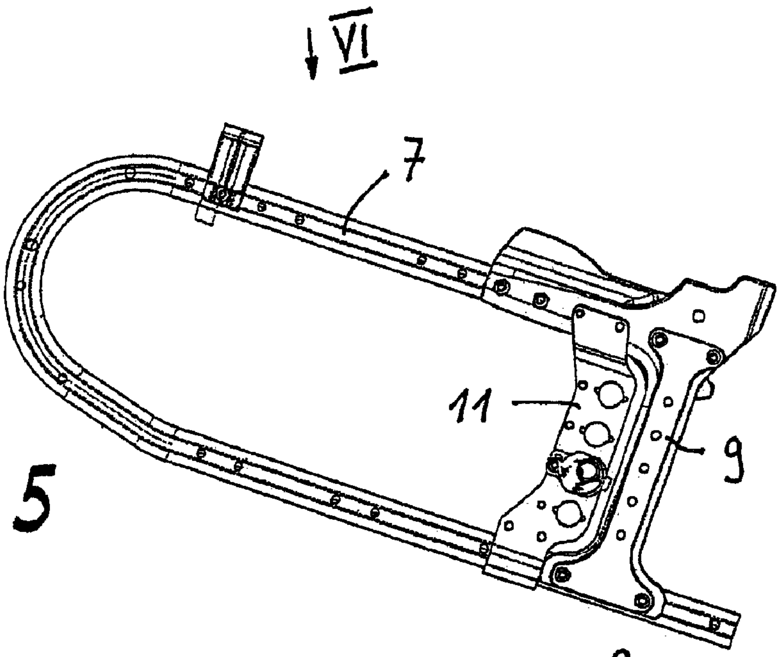
FIG. 5: frame section in FIG. 3 in a tilted position

The camber given in the design refers to a non-inclined seat position, that is, the horizontal position of the frame, as illustrated in FIG. 3. In order to be able to adjust the seat to the user's needs, there are four bore holes 12 in support 11 successively vertically arranged. Depending on which of the bore holes 12 receives the fitting 13, the frame 8 will incline backward, whereby the seat 5 will incline with it. FIG. 5 illustrates a severely over exaggerated angle position for frame section 7. The incline can also be produced by changing the wheel diameter.

Figure 1:
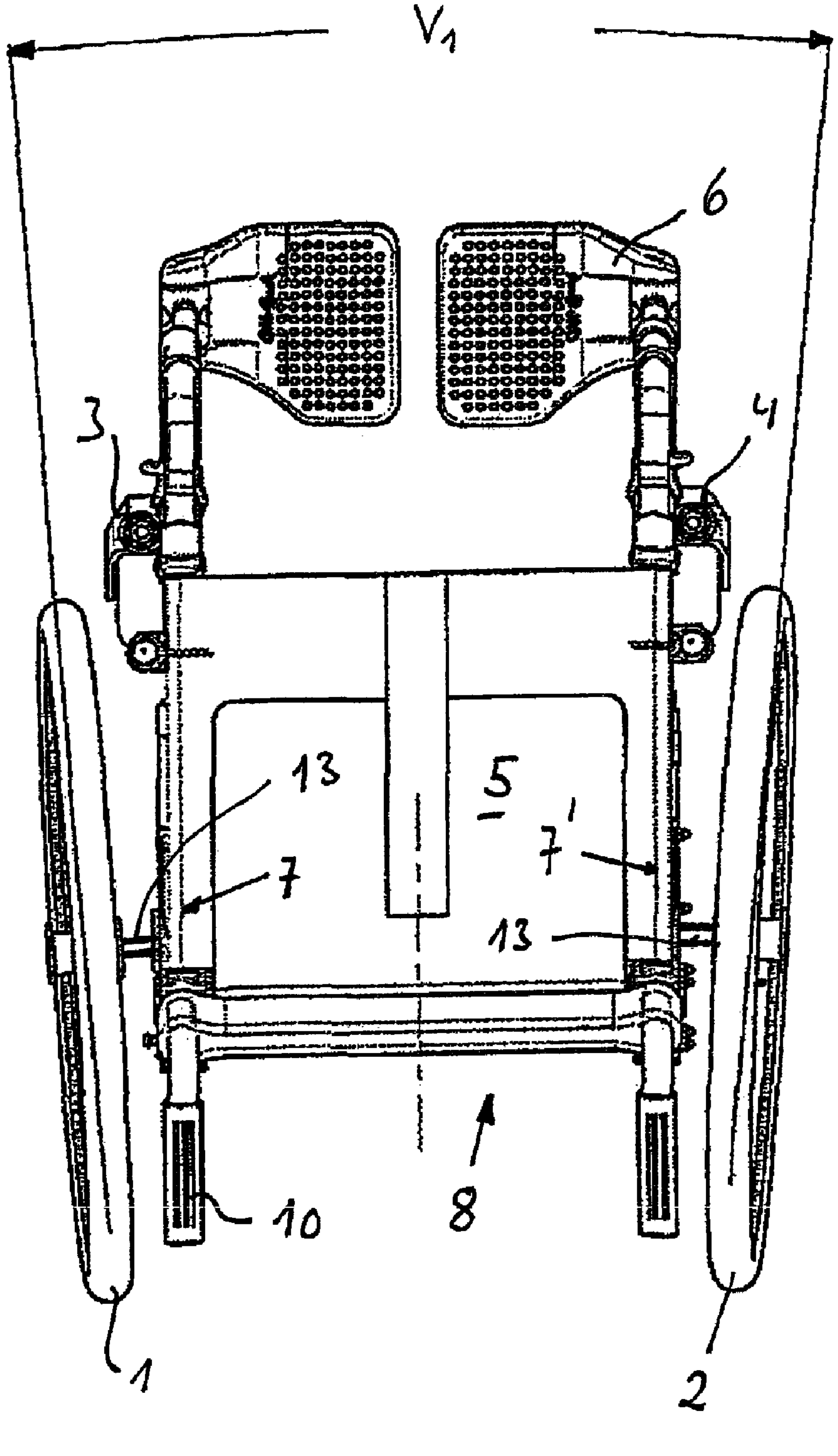
FIG. 1: top view of the wheelchair with toe-out of the back wheels.
Figure 2:
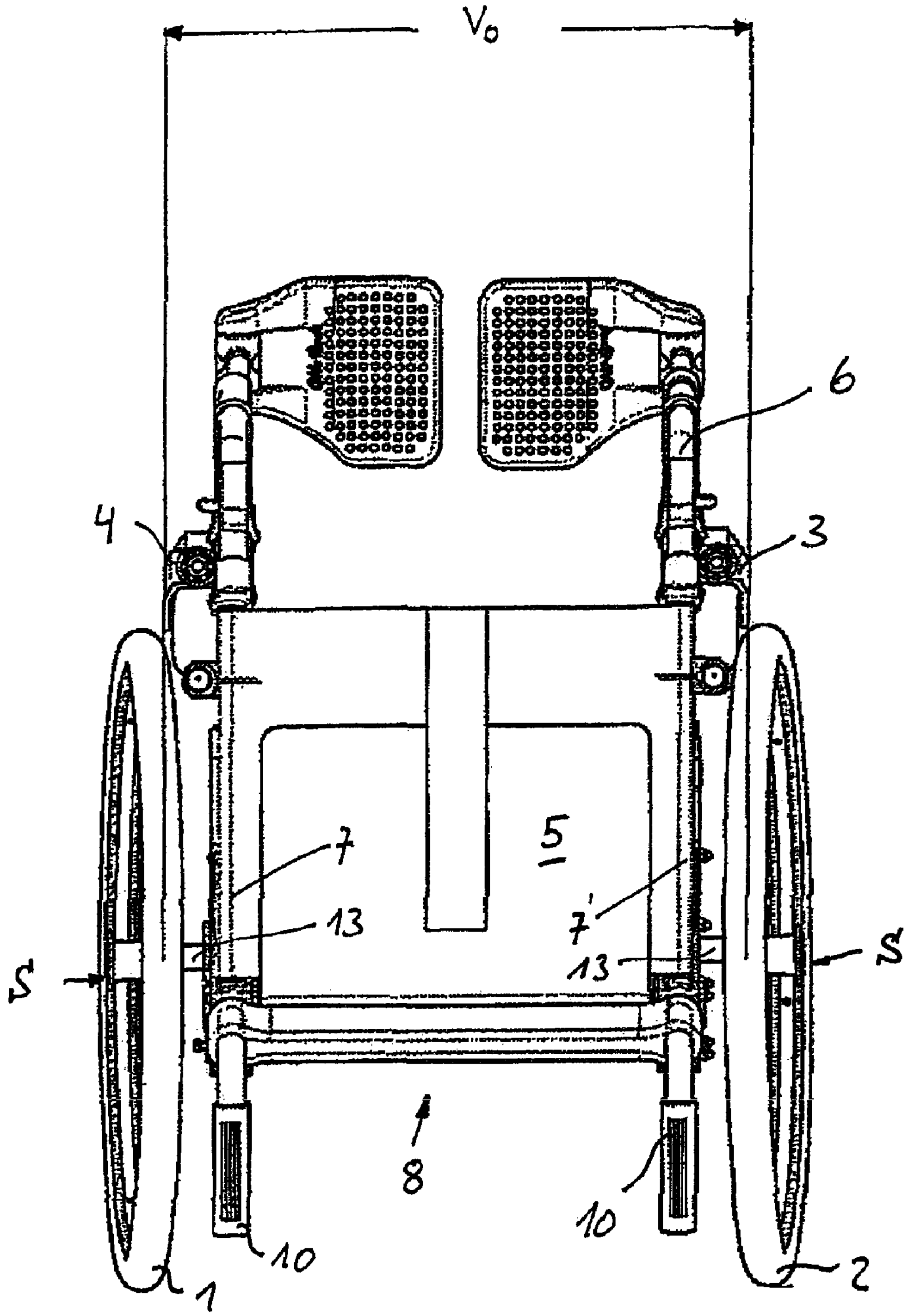
FIG. 2: top view pursuant to FIG. 1 with corrected track of back wheels.
Figure 4:
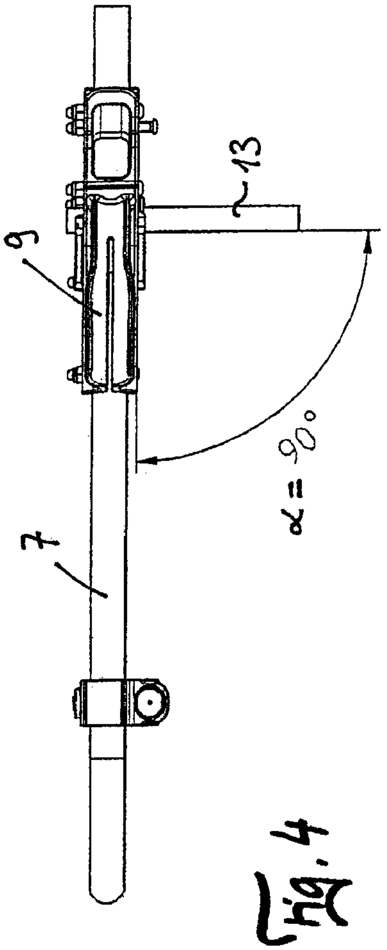
FIG. 4: view of the frame section pursuant to arrow IV according to FIG. 3.
Figure 6:
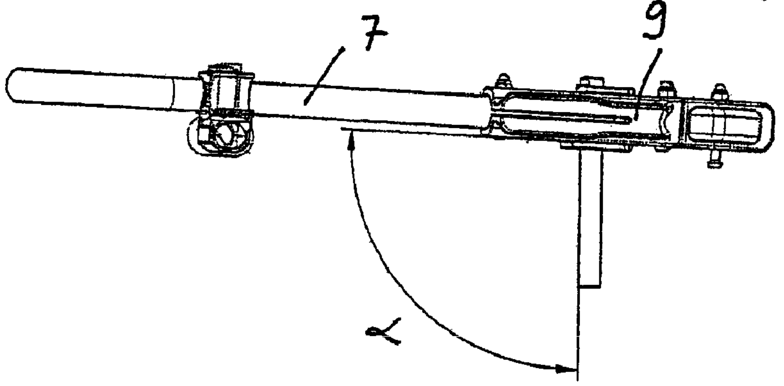
FIG. 6: view of the frame section in FIG. 5 pursuant to arrow VI.

If the frame sections 7, 7' pivot backward, the fittings 13 will also pivot on a path in space. As a result, the previously set wheel camber of 2.5°, as shown in FIG. 1, produces toe-out $V_1$ of the wheels 1, 2. With toe-out, an angle $\alpha$ of the wheel 1, 2 relative to the frame 7, which is illustrated by the top views of frame 7 in FIGS. 4 and 6, becomes greater than 90°. If the frame sections 7, 7' are horizontal, the angle is 90° (as shown in FIGS. 3 and 4) and the wheels 1, 2 have the correct track.

In order to be able to correct the track and bring the toe-out $V_1$ back to the design-indicated toe of $V_0$, bracket 14 is provided. See FIGS. 7-10. This bracket 14 consists of a U-shaped bent plate with holes 19 and curved slots 18 located opposite each other in either side. The holes 19 are provided with two opposite cutouts 17, protruding from the circumference, which are analogous to the depressions 21 and which work together with the lugs 16 of the support plates 15 and 15*a* to fix the position of the support plates 15, 15*a* on the bracket 14. Flat portions 22 on each side run parallel to the planned line, which connects the midpoints of the cutouts 17.

The bracket 14 is attached around the support 11 with each side positioned adjacent to opposite sides of support 11. The bracket 14 is then included with the fitting 13, as previously described. The support plates 15, 15*a* are placed on each side of the bracket 14, the fittings 13 pass through the support plates 15, 15*a* and holes 19 and are then screwed in. The bracket 14 is secured against pivoting by screw 20, which is inserted through the slots 18 and screwed into support 11. The screw 20, together with the ends of the slots 18, serves as a stop for bracket 14.

If frame 8 is tipped, and frame sections 7 and 7' pivot, the bracket 14 will pivot in the opposite direction, together with the support plates 15, 15*a*, which assume a set position relative to bracket 14 via their lugs 16. The position of the fittings 13 will then return to the design-indicated position, so that the toe-out $V_1$ disappears and the correct track $V_0$ is attained.

The flat areas 22 of the bracket 14 serve to simplify adjustability. The design indicated camber is set when the flat area 22 is absolutely horizontal, that is, parallel to the wheel footprint S (page level in FIGS. 1 and 2). A lever is added to the flat surface 22. If the horizontal position is achieved, the bracket 14 is secured via the nuts on fitting 13 and the design-indicated camber is also then set according to the incline of the frame 7, 7'. The pivot ability of the bracket 14 at an angle range of 15° is sufficient in order to correct the wheel track at a camber up to 8° even during severe inclination of the seat.

We claim:

1. A wheelchair having wheel track adjustability, the wheelchair including a frame, a seat positioned within the frame, at least one steerable front wheel and two drive wheels, each mounted on an axle to opposite sides of the frame, the wheelchair comprising:

a bracket pivotally mounted to the frame;

a support plate coupled to and positioned against the bracket such that pivoting of the bracket causes rotation of the support plate, the support plate having a hole and a varying thickness around the circumference of the hole, the support plate configured to mount one of the wheel axles to the frame and to set a desired camber angle of that wheel axle and drive wheel; and a fitting coupled to the support plate for removably mounting the wheel axle to the frame, wherein the support plate is rotatable over a pre-determined range when the fitting is coupled to the support plate so as to change the angle of the wheel axle relative to the frame and thereby adjust the wheel track of the wheelchair while maintaining the desired camber angle.

2. The wheelchair of claim 1, wherein the bracket comprises a hole having cutouts on its circumference and the support plate comprise lugs protruding from a face of the support plate, and wherein the lugs engage the cutouts to fix the position of the support plate against the bracket.

3. The wheelchair of claim 1, wherein the fitting passes through the support plate.

4. The wheelchair of claim 3, wherein the fitting also passes through the bracket.

5. The wheelchair of claim 1, further comprising:

a plurality of support plates, each support plate including lugs protruding from a face of the support plate;

a pair of fittings; and a pair of brackets pivotally mounted to opposing sides of the frame, the brackets each including two sides and aligned holes passing through both sides and including cutouts on their circumferences, wherein one support plate is positioned against each side of the bracket with the lugs engaging the cutouts to fix the position of the support plates against the bracket, with the rotation of the support plates provided by pivoting movement of the brackets and wherein one fitting is mounted to each bracket.

6. The wheelchair of claim 5, wherein each fitting passes through the support plates and one bracket.

7. The wheelchair of claim 6, wherein each pair of support plates are positioned with their varying thicknesses aligned larger to smaller resulting in an angled passage through the support plates and one bracket, such that each fitting is mounted at an angle relative to the frame.

8. The wheelchair of claim 7, wherein the frame of the wheelchair is pivotally adjustable relative to a surface upon which the wheelchair is positioned such that error of the wheel track is caused by the pivotal adjustment of the frame resulting in toe-in or toe-out, and wherein angular adjustment of the fittings by pivotal adjustment of the brackets corrects the for the error of the wheel track.

9. The wheelchair of claim 5, wherein each bracket comprises a curved slot in each side and wherein the pivoting movement of the bracket is constrained by the slot.

10. The wheelchair of claim 9, further comprising a pair of fastening components, each mounted to the frame and passing through the slot of one bracket, wherein the pivoting movement of that bracket is limited by the component abutting each end of the slot and wherein the component may be fastened to the frame when the bracket is at a desired angle relative to the frame to secure the bracket in the desired position.

11. The wheelchair of claim 1, wherein the bracket comprises a curved slot and wherein the pivoting movement of the bracket is constrained by the slot.

12. A wheelchair having wheel track adjustability, the wheelchair including a frame, a seat positioned within the frame, at least one steerable front wheel and two drive wheels, each mounted on an axle to opposite sides of the frame, the wheelchair comprising:

a bracket pivotally mounted to the frame;

a support plate coupled to and positioned against the bracket such that pivoting of the bracket causes rotation of the support plate, the support plate having a hole and a varying thickness around the circumference of the hole, the support plate configured to mount one of the wheel axles to the frame and to set a desired camber angle of that wheel axle and drive wheel; and a fitting for removably mounting the wheel axle to the frame, the fitting positioned adjacent to the support plate, wherein the support plate is rotatable over a pre-determined range when the fitting is adjacent the support plate so as to change the angle of the wheel axle relative to the frame and thereby adjust the wheel track of the wheelchair while maintaining the desired camber angle.

13. The wheelchair of claim 12, further comprising:

a plurality of support plates, each support plate including lugs protruding from a face of the support plate;

a pair of fittings; and a pair of brackets pivotally mounted to opposing sides of the frame, the brackets each including two sides and aligned holes passing through both sides and including cutouts on their circumferences, wherein one support plate is positioned against each side of the bracket with the lugs engaging the cutouts to fix the position of the support plates against the bracket, with the rotation of the support plates provided by pivoting movement of the brackets and wherein one fitting passes through and is attached to each bracket and its pair of support plates.

14. The wheelchair of claim 13, wherein each pair of support plates are positioned with their varying thicknesses aligned larger to smaller resulting in an angled passage through the support plates and one bracket, such that each fitting is mounted at an angle relative to the frame.

15. The wheelchair of claim 14, wherein the frame of the wheelchair is pivotally adjustable relative to a surface upon which the wheelchair is positioned such that error of the wheel track is caused by the pivotal adjustment of the frame resulting in toe-in or toe-out, and wherein angular adjustment of the fittings by pivotal adjustment of the brackets corrects the for the error of the wheel track.

* * * * *